(12) United States Patent
Lowell (10) Patent No.: US 9,917,887 B2
(45) Date of Patent: *Mar. 13, 2018

(54) METHODS FOR CONTENT INLINING AND DEVICES THEREOF

(71) Applicant: F5 Networks, Inc., Seattle, WA (US)

(72) Inventor: George Michael Lowell, Lynnwood, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,344

(22) Filed: Oct. 31, 2014

(65) Prior Publication Data
US 2015/0215381 A1 Jul. 30, 2015

Related U.S. Application Data (63) Continuation of application No. 13/307,923, filed on Nov. 30, 2011, now Pat. No. 8,954,492.

(51) Int. Cl.

| | | |
|---|---|---|
| *G06F 15/16* | (2006.01) |
| *H04L 29/08* | (2006.01) |
| *G06F 17/30* | (2006.01) |
| *H04L 12/751* | (2013.01) |
| *G06F 17/22* | (2006.01) |
| *H04L 29/06* | (2006.01) |

(52) U.S. Cl.
CPC .......... *H04L 67/10* (2013.01); *G06F 17/2247* (2013.01); *G06F 17/2264* (2013.01); *G06F 17/30887* (2013.01); *G06F 17/30896* (2013.01); *G06F 17/30899* (2013.01); *H04L 45/02* (2013.01); *H04L 67/42* (2013.01); *H04L 29/06* (2013.01); *H04L 29/08072* (2013.01); *H04L 67/2823* (2013.01); *H04L 67/2838* (2013.01)

(58) Field of Classification Search
CPC ............... H04L 29/08135; H04L 29/06; H04L 29/08072
See application file for complete search history.

(56) References Cited

U.S. PATENT DOCUMENTS

| | | |
|---|---|---|
| 6,295,542 B1 * | 9/2001 | Corbin .................... G06F 17/21 715/205 |
| 6,631,422 B1 | 10/2003 | Althaus et al. |
| 6,857,009 B1 | 2/2005 | Ferreria |
| 6,862,282 B1 | 3/2005 | Oden |
| 6,904,040 B2 | 6/2005 | Salapura et al. |
| 7,006,502 B2 | 2/2006 | Lin |
| 7,020,713 B1 | 3/2006 | Shah et al. |
| 7,161,904 B2 | 1/2007 | Hussain et al. |
| 7,257,633 B2 | 8/2007 | Masputra et al. |
| 7,555,608 B2 | 6/2009 | Naik et al. |
| 8,037,528 B2 | 10/2011 | Williams et al. |

(Continued)

*Primary Examiner* — Razu A Miah
(74) *Attorney, Agent, or Firm* — LeClairRyan, a Professional Corporation (57) ABSTRACT

A method, computer readable medium, and application delivery controller apparatus for content inlining includes obtaining content from one or more servers as requested by one or more clients, obtaining external content from the one or more servers as referenced by one or more external references included in the requested content, modifying the requested content to include at least one of the external content, and servicing the client request by communicating the modified requested content.

20 Claims, 4 Drawing Sheets

(56) References Cited

U.S. PATENT DOCUMENTS

| | | |
|---|---|---|
| 8,271,620 B2* | 9/2012 | Witchey .................... 709/220 |
| 8,838,817 B1 | 9/2014 | Biswas |
| 8,879,431 B2 | 11/2014 | Ridel et al. |
| 8,959,215 B2 | 2/2015 | Koponen et al. |
| 9,143,451 B2 | 9/2015 | Amdahl et al. |
| 2002/0010757 A1* | 1/2002 | Granik ............. G06F 17/30876 709/218 |
| 2003/0033445 A1* | 2/2003 | Simpson .......... G06F 17/30905 719/328 |
| 2003/0179755 A1 | 9/2003 | Fraser |
| 2004/0122700 A1* | 6/2004 | Aoki ..................... G06Q 30/02 705/400 |
| 2004/0177165 A1 | 9/2004 | Masputra et al. |
| 2006/0133374 A1 | 6/2006 | Sekiguchi |
| 2006/0209669 A1 | 9/2006 | Nishio |
| 2006/0229861 A1 | 10/2006 | Tatsuoka et al. |
| 2007/0019636 A1 | 1/2007 | Lau et al. |
| 2007/0067771 A1 | 3/2007 | Kulbak et al. |
| 2007/0147246 A1 | 6/2007 | Hurley et al. |
| 2007/0162434 A1* | 7/2007 | Alessi .............. G06F 17/30864 |
| 2007/0168525 A1 | 7/2007 | DeLeon et al. |
| 2007/0192543 A1 | 8/2007 | Naik et al. |
| 2008/0120592 A1 | 5/2008 | Tanguay et al. |
| 2008/0141246 A1 | 6/2008 | Kuck et al. |
| 2008/0228911 A1* | 9/2008 | Mackey ............ H04L 29/06047 709/224 |
| 2008/0281944 A1* | 11/2008 | Vorne ................ H04L 29/08846 709/218 |
| 2008/0309991 A1* | 12/2008 | Suse .................. H04N 1/00954 358/474 |
| 2009/0089487 A1 | 4/2009 | Kwon et al. |
| 2009/0097480 A1 | 4/2009 | Curtis et al. |
| 2009/0106363 A1* | 4/2009 | Fallen ................ G06F 11/0748 709/204 |
| 2009/0125511 A1* | 5/2009 | Kumar ................ G06Q 10/107 |
| 2009/0182843 A1* | 7/2009 | Hluchyj ............. H04L 67/2804 709/219 |
| 2009/0210498 A1* | 8/2009 | Sze ........................ H04L 67/04 709/206 |
| 2009/0257088 A1* | 10/2009 | Tokashiki .............. G06K 15/00 358/1.15 |
| 2009/0289828 A1* | 11/2009 | Hinchey ...................... 341/176 |
| 2010/0228814 A1* | 9/2010 | McKenna et al. ............ 709/203 |
| 2010/0325239 A1* | 12/2010 | Khedouri .......... G06F 17/30094 709/217 |
| 2011/0051017 A1* | 3/2011 | Kim ................ H04N 21/43615 348/734 |
| 2011/0075667 A1 | 3/2011 | Li et al. |
| 2011/0078303 A1 | 3/2011 | Li et al. |
| 2011/0091186 A1* | 4/2011 | Ayaki ..................... G06F 21/10 386/252 |
| 2011/0098087 A1 | 4/2011 | Tseng |
| 2011/0113095 A1* | 5/2011 | Hatami-Hanza ............. 709/204 |
| 2011/0188415 A1* | 8/2011 | Graziano ..................... 370/310 |
| 2011/0213911 A1 | 9/2011 | Eldus et al. |
| 2011/0252303 A1* | 10/2011 | Lemonik ............... G06F 17/218 715/234 |
| 2012/0154848 A1* | 6/2012 | Fukudome ............ G06F 3/1204 358/1.14 |
| 2012/0195273 A1 | 8/2012 | Iwamura et al. |
| 2012/0254293 A1* | 10/2012 | Winter et al. ................. 709/203 |
| 2012/0257506 A1 | 10/2012 | Baziamacci et al. |
| 2012/0258766 A1 | 10/2012 | Cho et al. |
| 2012/0287465 A1* | 11/2012 | Mizoguchi ........... G06F 3/1204 358/1.15 |
| 2013/0073401 A1* | 3/2013 | Cook ..................... G06Q 30/02 705/14.73 |
| 2013/0110790 A1* | 5/2013 | Matsumoto ............. G06F 12/00 707/679 |
| 2013/0182713 A1 | 7/2013 | Giacomoni et al. |
| 2013/0212464 A1* | 8/2013 | Kimura ................ G06F 3/1206 715/234 |
| 2013/0238472 A1 | 9/2013 | Fan et al. |
| 2013/0342648 A1* | 12/2013 | Yim ................... H04N 13/0048 348/43 |
| 2014/0071895 A1 | 3/2014 | Bane et al. |
| 2014/0099945 A1 | 4/2014 | Singh et al. |
| 2014/0101781 A1* | 4/2014 | Bouknight .............. G06F 21/10 726/28 |
| 2014/0105069 A1 | 4/2014 | Potnuru |
| 2014/0187199 A1 | 7/2014 | Yan et al. |
| 2014/0286316 A1 | 9/2014 | Park et al. |
| 2015/0058595 A1 | 2/2015 | Gura et al. |

* cited by examiner

METHODS FOR CONTENT INLINING AND DEVICES THEREOF

This application is a continuation of prior U.S. patent application Ser. No. 13/307,923, filed Nov. 30, 2011, which is herein incorporated by reference in its entirety.

FIELD

This technology generally relates to servicing client requests for Web pages from one or more networked servers and, more particularly, to methods for content inlining and devices thereof.

BACKGROUND

The speed with which Web pages load on a client device is important for Web page hosts, particularly those hosts concerned with increasing views, such as retailers and those Websites deriving advertising revenue based on views, because users will tend to navigate away from pages having a lengthy load time. Accordingly, users are more likely to view a Web page, and navigate various pages of a website, when response and load times are relatively fast. Of particular concern for hosts is the load time of a home page, index page, and/or splash page which is often the initial entrance to a larger website in which the host is attempting to attract and retain users and/or provide an effective user experience.

However, in order to attract and retain users to a Web page, hosts often enhance the viewer experience by providing various functionality and/or media by referencing external content such as script files, in the case of functionality, and/or image files, in the case of media, for example. In a typical request for a Web page over a network, the request is serviced by providing a hypertext markup language (HTML) file to a browser, located on a client computing device, as retrieved from a server, which may be a substantial distance from the client computing device. Upon receipt of the HTML file, the browser parses the file and further communicates with one or more servers to retrieve the referenced external content. These additional communications can add substantial latency resulting in delay in loading the Web page on the client computing device browser, reduced usability, and/or reduced effectiveness, particularly where the distance to the server(s), and associated round trip time and/or latency, is substantial.

SUMMARY

A method for content inlining including obtaining, at an application delivery controller, content from one or more servers as requested by one or more clients, obtaining, at the application delivery controller, external content from the one or more servers as referenced by one or more external references included in the requested content, modifying, with the application delivery controller, the requested content to include at least one of the external content, and servicing, with the application delivery controller, the client request by communicating the modified requested content.

A computer readable medium having stored thereon instructions for content inlining comprising machine executable code which when executed by at least one processor, causes the processor to perform steps including obtaining content from one or more servers as requested by one or more clients, obtaining external content from the one or more servers as referenced by one or more external references included in the requested content, modifying the requested content to include at least one of the external content, and servicing the client request by communicating the modified requested content.

An application delivery controller apparatus including one or more processors, a memory coupled to the one or more processors, and a network interface unit coupled to the one or more processors and the memory via at least one bus, at least one of the network interface units configured to implement and the one or more processors configured to execute programmed instructions stored in the memory including obtaining content from one or more servers as requested by one or more clients, obtaining external content from the one or more servers as referenced by one or more external references included in the requested content, modifying the requested content to include at least one of the external content, and servicing the client request by communicating the modified requested content.

This technology provides a number of advantages including retrieving external content, referenced by an HTML Web page, at a networked application delivery controller in closer proximity to the server(s) hosting the content, prior to servicing the client request for the Web page, thereby reducing the round trip latency normally resulting in successive requests to retrieve the external content from the relatively further client computing device to the server(s). With this technology, fewer objects are required to be downloaded by the client, fewer connection setups and teardowns are required for the client and potentially the server, fewer domain name server (DNS) lookups are required, there is reduced client and server overhead, there is an increased likelihood of successful transfer and reduction in data/packet loss due to an increased quantity of content being downloaded to the client in a single stream, the compression ratio of the requested content or Web page will likely be higher as inlining the external content provides more opportunity for duplication, and fewer connections and HTTP requests are required for other intermediary network devices, such as load balancers and other intelligent proxy devices.

DETAILED DESCRIPTION

Figure 1:
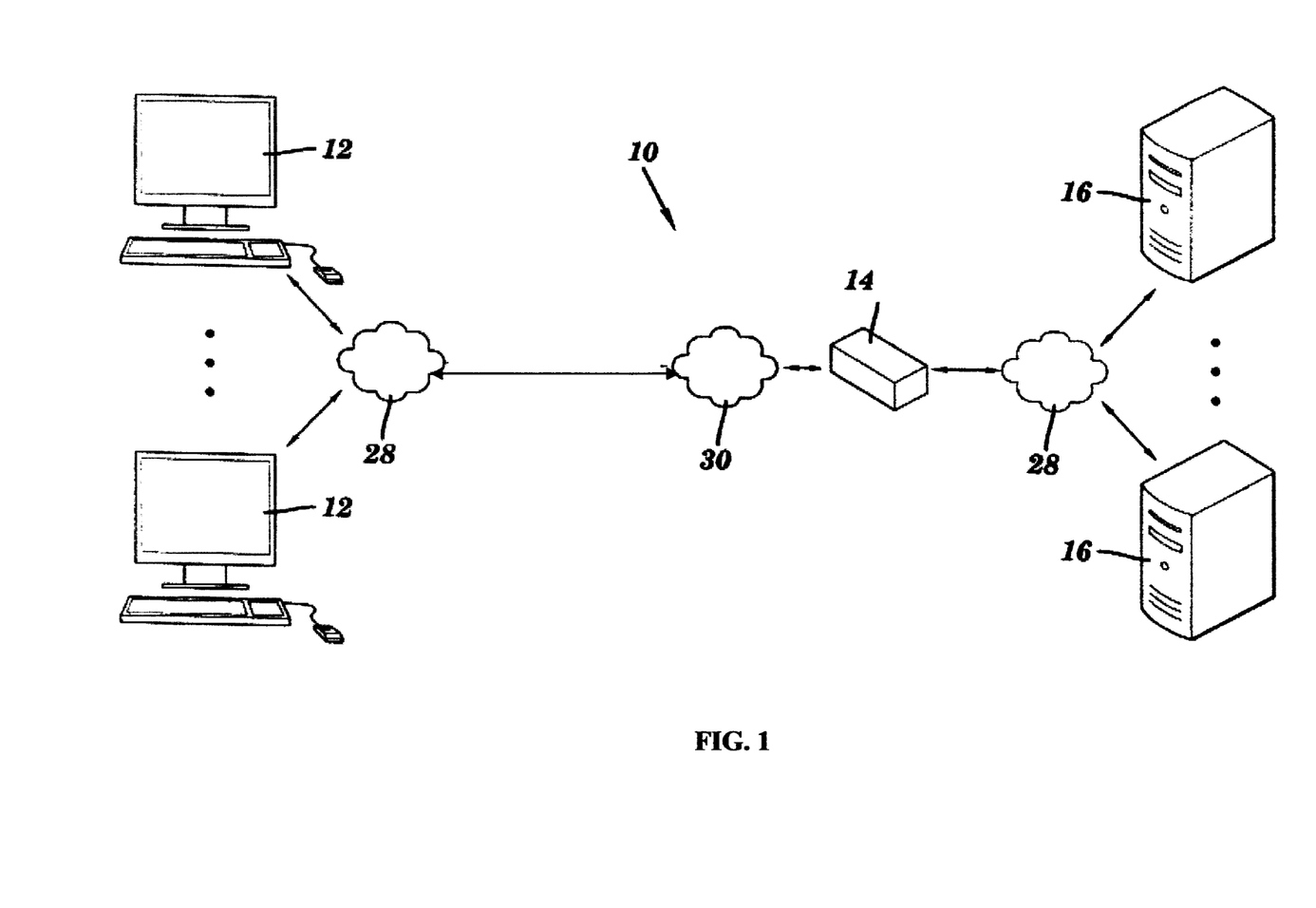
FIG. 1 is a block diagram of a network environment which incorporates a application delivery controller implementing content inlining.
Figure 2:
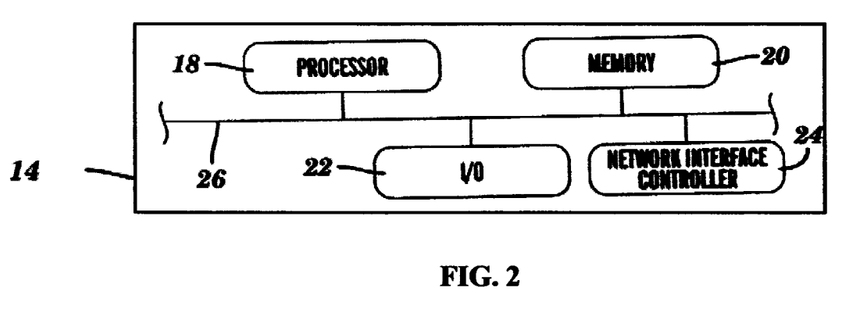
FIG. 2 is a block diagram of an application delivery controller implementing content inlining in the network environment shown in FIG. 1.

An exemplary network environment 10 is illustrated in FIGS. 1 and 2 as including client computing devices 12, application delivery controller 14 in an asymmetric deployment, and servers 16 which are coupled together by local area networks (LAN) 28 and wide area network (WAN) 30, although other types and numbers of devices and components in other topologies could be used. While not shown, the system 10 may include additional network components, such as routers, switches and other devices.

More specifically, application delivery controller 14 is coupled to client computing devices 12 through one of the LANs 28, although the client computing devices 12 or other devices and application delivery controller 14 may be coupled together via other topologies. Additionally, application delivery controller 14 is coupled to the servers 16 through another one of the LANs 28, although the servers 16 or other devices and application delivery controller 14 may be coupled together via other topologies. LANs 28 each may employ any suitable interface mechanisms and communications technologies including, for example, telecommunications in any suitable form (e.g., voice, modem, and the like), Public Switched Telephone Network (PSTNs), Ethernet-based Packet Data Networks (PDNs), combinations thereof, and the like. The application delivery controller 14 is coupled to client computing devices through the WAN 30, which may comprise any wide area network (e.g., Internet), although any other type of communication network topology may be used, and one of the LANs 28. Various network processing applications, such as CIFS applications, NFS applications, HTTP Web Server applications, FTP applications, may be operating on servers 16 and transmitting data (e.g., files, Web pages) through the application delivery controller in response to requests for content from client computing devices 12.

In this example, the application delivery controller 14 may run one or more traffic management applications on one or more processors 18 to manage network traffic by optimizing, securing and accelerating the traffic between client computing devices 12 and servers 16, and/or one or more applications to manage the manipulation, compression, and caching of content, application acceleration, load balancing, rate shaping, and SSL offloading, although application delivery controller 14 may perform other network related functions. Moreover, the network traffic may be received and transmitted by application delivery controller 14 from and to one or more of the LANs 28 and WAN 30 in the form of network data packets in the TCP/IP protocol, although the network data packets could be in other network protocols.

Application delivery controller 14 includes processor(s) 18, memory 20, interface(s) 22, and network interface controller (NIC) 24, which are coupled together by bus 26, although application delivery controller 14 may comprise other types and numbers of elements in other configurations. Although the application delivery controller 14 is shown in FIG. 1 in this example as being a standalone device, such as a BIG-IP® device offered by F5 Networks, Inc., of Seattle, Wash., it should be appreciated that the application delivery controller 14 could also be one of several blades servers coupled to a chassis device, such as a VIPRION® device, also offered by F5 Networks, Inc., of Seattle, Wash.

Processor(s) 18 execute the traffic management applications that handle the network traffic between applications on the client computing devices 12 and servers 16 as well as one or more computer-executable instructions stored in the memory 20 and other operations illustrated and described herein. The processor(s) 18 may comprise one or more central processing units ("CPUs") or general purpose processors with one or more processing cores, such as AMD® processor(s), although other types of processor(s) could be used (e.g., Intel®).

Figure 3:
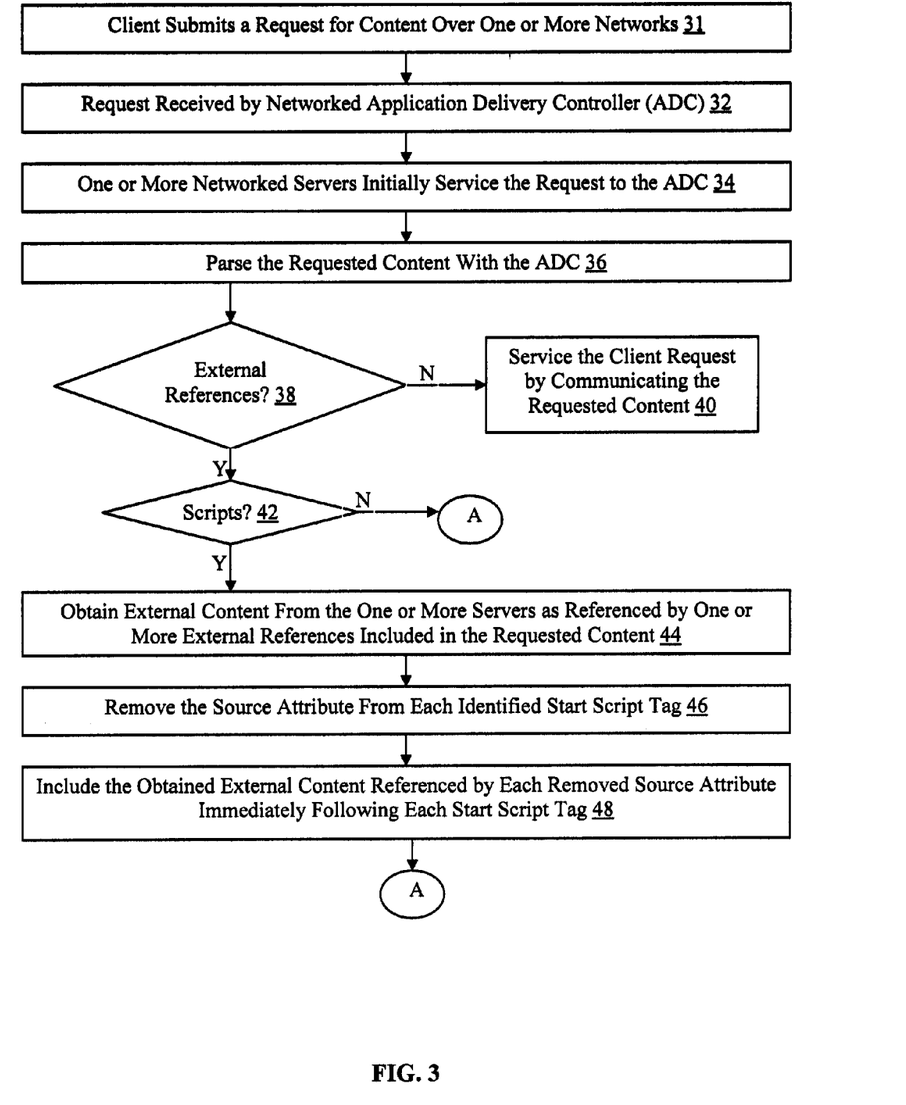
FIG. 3 is a flowchart of a method for content inlining and particularly for inlining script external content.
Figure 4:
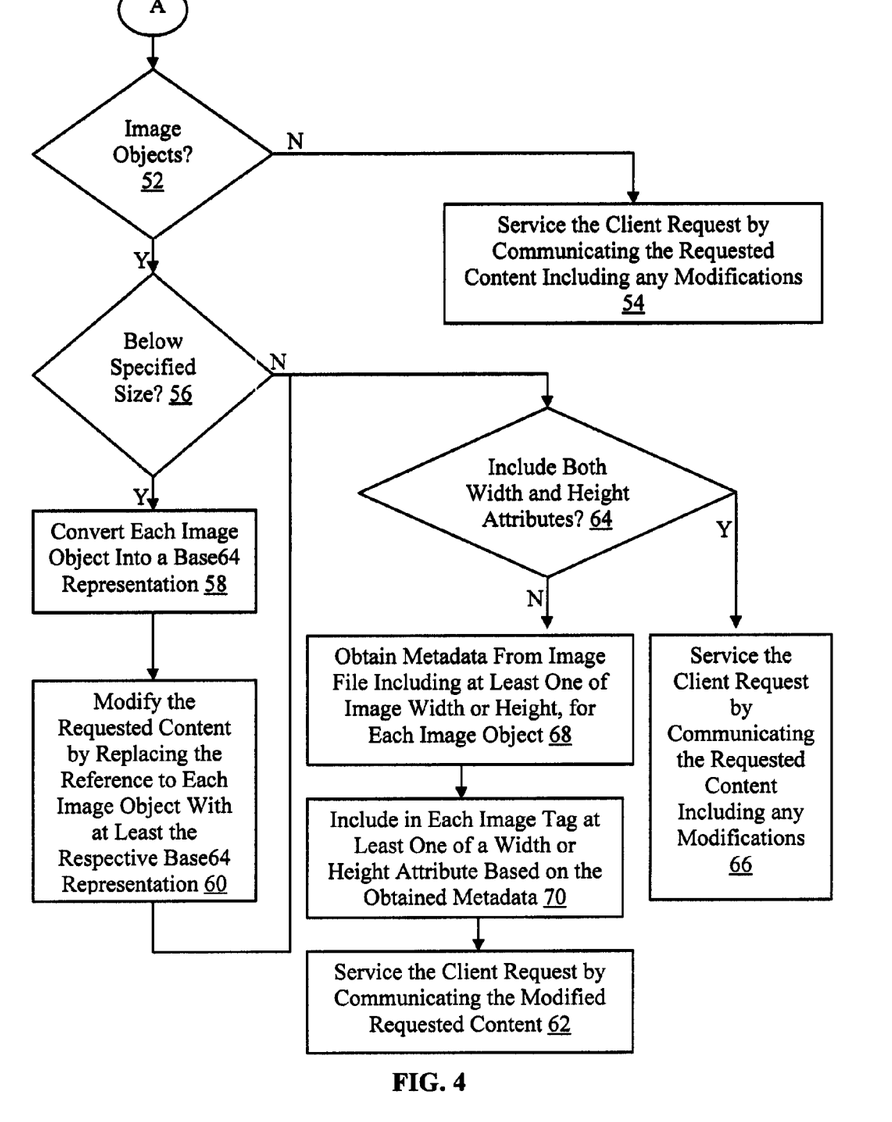
FIG. 4 is a flowchart of a method for content inlining and particularly for inlining images as well as a method for providing more effective image presentation.

Memory 20 may comprise one or more tangible storage media such as, for example, RAM, ROM, flash memory, CD-ROM, floppy disk, hard disk drive(s), solid state memory, DVD, or any other memory storage type or devices, including combinations thereof, which are known to those of ordinary skill in the art. Memory 20 may store one or more computer-readable instructions that may be executed by the one or more processor(s) 18 and/or the NIC 24. When these stored instructions are executed, they may implement processes that are illustrated, for exemplary purposes only, by the flow chart diagrams shown in FIGS. 3 and 4. It should be appreciated the flow chart diagrams shown in FIGS. 3 and 4 are representative of example steps or actions that may be embodied or expressed as one or more computer or machine readable instructions or logic that may be executed by the processor(s) 18 and/or NICs 24 in application delivery controller 14 shown in FIGS. 1 and 2. In this example, the machine readable instructions may embody an algorithm or computer program for execution by at least one of: (a) one or more processors each having one or more processor cores, (b) hardware specifically configured to perform the instructions (e.g., ASICs, FPGAs) and (c) one or more other suitable processing device(s). The algorithm or computer program may be embodied in software stored on memory 20, for example.

NIC 24 may comprise specialized hardware to achieve maximum execution speeds, such a field programmable gate arrays ("FPGAs"), although other hardware and/or software may be used, such as ASICs, field programmable logic devices ("FPLDs"), programmable logic units ("PLUs"), software executed by the processor 18, and combinations thereof. The use of the specialized hardware in this example, however allows the NIC 24 and/or the processor 18 executing programmed instructions stored in memory 20 to efficiently assist with the transmission and receipt of data packets via WAN 30 and the LANs 28 and implement content inlining, as illustrated and described herein. It is to be understood that NIC 24 may take the form of a network peripheral card or other logic that is installed inside a bus interface within the application delivery controller 14 or may be an embedded component as part of a computer processor motherboard, a router or printer interface, or a USB device that may be internal or external to the application delivery controller 14.

Input/output interfaces 22 include one or more keyboard/mouse interfaces, display devices interfaces, and other physical and/or logical mechanisms for enabling application delivery controller 14 to communicate with the outside environment, which includes WAN 30, LANs 28 and users (e.g., administrators) desiring to interact with application delivery controller 14, such as to configure, program or operate it. The bus 26 is a hyper-transport bus in this example, although other bus types may be used, such as PCI.

Each of the client computing devices 12 and servers 16 include a central processing unit (CPU) or processor, a memory, and an interface or I/O system, which are coupled together by a bus or other link, although other numbers and types of network devices could be used. The client computing devices 12, in this example, may run interface applications, such as Web browsers, that may provide an interface to make requests for and send content and/or data to different server based applications via the LANs 28 and WAN 30. Generally, servers 16 process requests received from requesting client computing devices 12 via LANs 28 and WAN 30 according to the HTTP-based application RFC 2616 protocol or the CIFS or NFS protocol in this example, but the principles discussed herein are not limited to this example and can include other application protocols. A series of applications may run on the servers 16 that allow the transmission of data, such as a data file or metadata, requested by the client computing devices 12. The servers 16 may provide data or receive data in response to requests directed toward the respective applications on the servers 16 from the client computing devices 12. As per TCP, packets may be sent to the servers 16 from the requesting client computing devices 12 to send data. It is to be understood that the servers 16 may be hardware or software or may represent a system with multiple servers 16, which may include internal or external networks. In this example the servers 16 may be any version of Microsoft® IIS servers or Apache® servers, although other types of servers may be used. Further, additional servers may be coupled to the LAN 28 and many different types of applications may be available on servers coupled to the LAN 28.

Although an exemplary network environment 10 with client computing devices 12, application delivery controller 14, servers 16, LANs 28 and WAN 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for content inlining will now be described with reference to FIGS. 1-4. In this particular example, the data communications are initiated at step 31 as one or more requests for content by a user of one of the client computing devices 12. Accordingly, in step 31, one of the client computing devices 12 initiates transmission of original data packets which are received by the application delivery controller 14, at step 32, that is configured to manage content manipulation and/or application acceleration. The client request is communicated to and initially serviced by the server(s) 16. In this example, the request for content is for a hypertext markup language (HTML) Web page file, which can be an initial home page, index page, and/or splash page, for example, although the request for content could be for any HTML file, or any other file including external references. At step 36, the requested content is obtained by the application delivery controller 14 from the server(s) 16 which parses the requested content to determine whether there are any external references at step 38. External references can include references to external content, such as java script files, cascading style sheets (CSS), and/or image objects, among others, referred to by the requested content HTML file but stored elsewhere, such as in the server(s) 16. The content referenced by the external references is stored externally for various reasons including that such arrangement allows the external files to be independently editable, accessible for referencing by multiple files or Web pages, and logically arranged and/or stored. Such external references can be represented by script and/or image tags identified by the application delivery controller 14 when parsing the requested content at step 36. If the application delivery controller 14 determines there are no external references, it can service the client request by communicating the requested content at step 40.

If the application delivery controller 14 determines there are external reference(s) in the requested content, at step 42, it further determines whether there are any external references to script files. Such external references can be identified by one or more script tags including a source attribute such as "<script src=path/X.js></script>" whereby the path represents a location, such as on the server(s) 16, where the java script file X.js is located. If the application delivery controller 14 determines there are no external references to script files in the requested content, the method can optionally proceed to step 52, the operation of which is discussed in detail below.

If the application delivery controller 14 determines there are external reference(s) to a script file, it obtains, at step 44, the external content (e.g. a script file) from the location (e.g. server(s) 16) referenced by the external reference included in the source attribute for one or more script tags and optionally stores the external content in a memory 20, such as in cache. At step 46, the application delivery controller 14 modifies the requested content by removing the source attribute from each of the start script tags including an external reference and, at step 48, includes the obtained external content referenced by each removed source attribute immediately following each respective start script tag (e.g. "<script>[content of X.js]</script>"). As a result, the modified requested content includes the content of the externally referenced script inline.

In one example, the application delivery controller 14 services the client request by communicating the modified requested content to the client computing device 12 over the WAN 30 and LAN 28 networks. Upon receipt by the client computing device 12, the browser can render the Web page without having to traverse external references and retrieve external files, such as script files, from the server(s) 16. Instead, the substantially more efficient, with respect to at least speed, latency, and round trip time, application delivery controller 14 has already retrieved the external content from the server(s) 16, which are relatively closer in proximity, and performed a content inlining of the requested Web page resulting in the modified requested Web page content that can subsequently be rendered by the browser.

While it may be advantageous to perform the above-described content inlining for script files and service the client request by returning the modified requested content, optionally, prior to servicing the client request, the application delivery controller 14 can determine, at step 52, whether there are any external references to one or more image objects. Such external references can be identified by one or more image tags. If the application delivery controller 14 determines there are no external references to image objects in the requested and/or modified requested content, at step 54, it services the client request by communicating the requested content and/or modified requested content to the client computing device 12 over the WAN 30 and LAN 28 networks.

If the application delivery controller 14 determines there are external references to image objects in the requested and/or modified requested content, in one example, the application delivery controller 14 retrieves all of the referenced image objects from the location referenced by the source attribute of each image tag and stores the image objects in the memory 20, such as in cache. At step 56, the application delivery controller 14 optionally determines whether the referenced image objects are below a specified storage size from the metadata associated with each of the retrieved image objects. The specified size can be predetermined by an operator or manufacturer of the application delivery controller 14 and/or the specified size can correspond to the maximum uniform resource locator (URL) size accepted by one or more browsers. In some embodiments, the specified size is determined, for each client computing device 12 requesting content, based on the browser identification included in an HTTP header communicated with the request for content, as determined from a lookup table stored in memory 20 which includes correlated browser identifications and maximum URL sizes. A default specified size can optionally be established and utilized for any browser identifications that are deemed unresolvable and/or unreliable by the application delivery controller 14.

If the application delivery controller 14 determines, at step 56, there are external references to one or more image objects below a specified size, at step 58, the application delivery controller 14 converts each such image object into a base64 representation. In this example, at step 60, the application delivery controller modifies the requested and/or modified requested content by replacing the reference to each image object in each source attribute with at least the base64 representation of the referenced image object. In some embodiments, for proper browser rendering, the source attribute of each image tag is further modified by the application delivery controller 14 to include the media type and an indication of the image representation as base64 (e.g. "<img src="data:image/gif;base64,[base64 representation of referenced image]">"). The image type can be determined by the application delivery controller 14 based on metadata associated with the image object, the extension of the image object file referenced by the original source attribute, and/or an inspection of the file contents. While the above example has been described with respect to HTML image tags, image objects could also included inline in a base64 representation in one or more CSS expressions (e.g. "body{background-image:url (data:image/png;base64,[base64 representation of referenced image])}").

In one example, the application delivery controller 14 can service the client request by communicating the modified requested content to the client computing device 12 over the WAN 30 and LAN 28 networks. Upon receipt by the client computing device 12, one or more images below a specified size will be represented inline in the modified requested content which, when interpreted by a browser on the client computing device 12, will automatically render the images below a specified size without having to retrieve each image from an external location, such a server(s) 16. Accordingly, Web page load time will be improved as some browsers do not render a Web page until all externally referenced image objects have been retrieved. For those browsers that will initially render a Web page prior to all externally referenced image objects being retrieved, usability and presentation will be improved because the images below a specified size can be automatically rendered and the page layout will not have to be modified in response to each such object being retrieved and rendered by the browser.

While it may be advantageous to perform the above-described content inlining for script files and/or images below a specified size, and service the client request by communicating the modified requested content, optionally, the application delivery controller 14 determines, at step 64, whether the requested and/or modified requested content includes both an image width and an image height for one or more, but preferably all, image tags. While generally optional, such attributes are preferable because some browsers will not render a Web page without image width and height information for all images, and other browsers will not properly initially render a Web page, such as by allocating the appropriate space, when image width and height information is not included in one or more image tags. In either of the above cases, the Web page rendering is delayed inhibiting the user experience. If the application delivery controller 14 determines all image tags include both image width and image height attributes, at step 66, it can service the client request by communicating the requested and/or modified requested content to the client computing device 12 over the WAN 30 and LAN 28 networks.

If the application delivery controller 14 determines there is at least one image tag that does not include at least one of an image width attribute or an image height attribute, it can obtain metadata at step 68, such as associated with the image file previously retrieved and stored in cache memory 20, including at least one of the image width or image height. Generally, for such image tags, neither the image width nor the image height attribute will be included and, in such cases, it is preferable that the application delivery controller 14 obtain metadata including both the image width and the image height for inclusion in the image width and image height attributes of each such image tag. At step 70, the application delivery controller can modify the requested and/or modified requested content such that one or more image tags include both image width and image height attributes to include the obtained image width and height, such as "<img src="data:image/gif;base64,[base64 representation of referenced image]" width="Y" height="Z">, "<img src="X.gif" width="Y" height="Z">", and/or <img src="path/x.png" style="width: Y; height: Z;">, where "Y" and "Z" are numerical values representing image width and height, respectively.

In other examples in which the requested content includes CSSs, a style including dimensions information for an identified element can be defined in a CSS file (e.g. in example.css: "#element{ width: Y; height: Z}", where "Y" and "Z" are numerical values representing image width and height, respectively) and linked to by the requested HTML file (e.g. "<link rel="stylesheet" href="example.css" type="text/css"/> <img id="element">"). In another example in which the requested content includes CSSs, a style for a class of objects can be defined in a CSS file (e.g. in example.css: img.eg {width: Y; height: Z}", where "Y" and "Z" are numerical values representing image width and height, respectively) and linked to by the requested HTML file (e.g. "<link rel="stylesheet" href="example.css" type="text/css"/> <img class="eg">"). Other methods of including image dimension information can also be provided.

At step 62, the application delivery controller 14 services the client request by communicating the modified requested content to the client computing device 12 over the WAN 30 and LAN 28 networks. Optionally, the application delivery controller 14 stores the modified request content in cache memory 20 such that a subsequent request from a client computing device 12 for the content can be serviced based on the cached content which includes modifications such as including some or all of the externally referenced content inline. Upon rendering the modified requested content, a browser on the client computing device 12 can initially render the page while waiting to obtain externally referenced images and/or allocate the appropriate space for the image(s) referenced by an image tag including both image width and image height parameters, thereby reducing any modification to the presentation of the Web page after an initial rendering by the browser. Accordingly, by retrieving the width and height for one or more of the images, whether represented inline or referred to by external references in the requested content, the application delivery controller 14 substantially reduces the load time for the requested Web page content in browsers that require retrieval of all image object data, including dimension information, prior to initially rendering the Web page.

As described herein this technology provides for faster and more effective presentation of Web pages on client computing devices 12 by performing one or more of the methods described above at an application delivery controller 14 asymmetrically disposed on an opposing side of a WAN from the client computing device 12 and in relatively close proximity to the server(s) 16 storing the requested content and externally referenced content referred to therein. With this technology, Web pages, and particularly home pages, index pages, and splash pages can load more quickly in a browser on a client computing device 12 thereby providing an enhanced user experience more likely to retain the user's attention to the Web page, without sacrificing functionality and/or presentation provided by Java scripts, CSSs, and images.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for content inlining implemented by an application delivery controller system comprising one or more application delivery controller apparatuses, client devices, or server devices, the method comprising:
   obtaining content from one or more servers as requested by a client computing device, the content comprising a hypertext markup language (HTML) document;
   identifying when one or more types of external references are included in the requested content and determining when the identified one or more types of external references in the requested content is an image object;
   obtaining external content referenced by the image object included in the requested content, when the determining indicates that the identified one or more types of external references in the requested content is the image object;
   modifying prior to sending the requested content to the client computing device, the requested content to replace at least a portion of the image object with the image object referenced external content inline, wherein the inline external content referenced by the image object does not include another reference to an external location; and
   servicing the request by communicating the modified requested content to the client computing device.

2. The method as set forth in claim 1 further comprising steps to:
   identify each start script tag including a source attribute referencing the external content;
   obtain external content referenced by the source attribute included in the requested content; and
   remove the source attribute and include the obtained external content referenced by the removed source attribute immediately following the start script tag, for each identified start script tag.

3. The method as set forth in claim 1 further comprising steps to convert each of the image object into a base64 representation and replace the reference to the image object with at least the base64 representation for each of an image tag in the requested content including a source attribute referencing an image object below a specified size before the requested content is modified.

4. The method as set forth in claim 3 wherein the specified size comprises an input predefined specified size or a maximum size of a uniform resource locator of a browser on the client computing device associated with the request for content.

5. The method as set forth in claim 1 further comprising steps to, for each of an image tag in the requested content including a source attribute referencing the image object and not including at least one of a width attribute or a height attribute:
   obtain metadata from the image object, including at least one of image width or image height; and
   include in the image tag at least one of a width attribute or a height attribute based on the obtained metadata.

6. A non-transitory computer readable medium having stored thereon instructions for content inlining comprising executable code which when executed by one or more processors, causes the one or more processors to:
   obtain content from one or more servers as requested by a client computing device, the content comprising a hypertext markup language (HTML) document;
   identify when one or more types of external references are included in the requested content and determine when the identified one or more types of external references in the requested content is an image object;
   obtain external content referenced by the image object included in the requested content, when the determining indicates that the identified one or more types of external references in the requested content is the image object;
   modify, prior to sending the requested content to the client computing device, the requested content to replace at least a portion of the image object with the image object referenced external content inline, wherein the inline external content referenced by the image object does not include another reference to an external location; and service the request by communicating the modified requested content to the client computing device.

7. The non-transitory computer readable medium as set forth in claim 6 wherein the executable code when executed by the one or more processors further causes the one or more processors to:
identify each start script tag including a source attribute referencing the external content;
obtain external content referenced by the source attribute included in the requested content; and
removing the source attribute and include the obtained external content referenced by the removed source attribute immediately following the start script tag, for each identified start script tag.

8. The non-transitory computer readable medium as set forth in claim 6 wherein the executable code which when executed by the one or more processors further causes the one or more processors to perform steps further comprising, for each of an image tag in the requested content including a source attribute referencing an image object below a specified size, before modifying the requested content, converting each image object into a base64 representation and replace the reference to the image object with at least the base64 representation.

9. The non-transitory computer readable medium as set forth in claim 8 wherein the specified size comprises a predefined specified size established by one of an operator of the one or more application delivery controller devices or a manufacturer of the one or more application delivery controller devices or a maximum size of a uniform resource locator of a browser on the client computing device associated with the request for content.

10. The non-transitory computer readable medium as set forth in claim 6 wherein the executable code when executed by the one or more processors, further causes the one or more processors to perform steps further comprising, for each of an image tag in the requested content including a source attribute referencing an image object and not including at least one of a width attribute or a height attribute:
obtain metadata from the image object, including at least one of image width or image height; and
include in the image tag at least one of a width attribute or a height attribute based on the obtained metadata.

11. An application delivery controller apparatus comprising one or more processors and a memory, the memory comprising programmed instructions stored thereon and the one or more processors configured to be capable of executing the stored programmed instructions to:
obtain content from one or more servers as requested by a client computing device, the content comprising a hypertext markup language (HTML) document;
identify when one or more types of external references are included in the requested content and determine when the identified one or more types of external references in the requested content is an image object;
obtain external content referenced by the image object included in the requested content, when the determining indicates that the identified one or more types of external references in the requested content is the image object;
modify, prior to sending the requested content to the client computing device, the requested content to replace at least a portion of the image object with the image object referenced external content inline, wherein the inline external content referenced by the image object does not include another reference to an external location; and
service the request by communicating the modified requested content to the client computing device.

12. The application delivery controller apparatus as set forth in claim 11 wherein the one or more processor are further configured to be capable of executing the stored programmed instructions to:
identify each start script tag including a source attribute referencing the external content;
obtain external content referenced by the source attribute included in the requested content; and
remove the source attribute and include the obtained external content referenced by the removed source attribute immediately following the start script tag, for each identified start script tag.

13. The application delivery controller apparatus as set forth in claim 11 wherein the one or more processor are further configured to be capable of executing the stored programmed instructions to: convert each of the image object into a base64 representation and replace the reference to the image object with at least the base64 representation for each of an image tag in the requested content including a source attribute referencing an image object below a specified size, before modifying the requested content.

14. The application delivery controller apparatus as set forth in claim 13 wherein the specified size comprises a predefined specified size established by one of an operator of the one or more application delivery controller devices or a manufacturer of the one or more application delivery controller devices or a maximum size of a uniform resource locator of a browser on the client computing device associated with the request for content.

15. The application delivery controller apparatus as set forth in claim 11 wherein the one or more processor are further configured to be capable of executing the stored programmed instructions to, for of an each image tag in the requested content including a source attribute referencing an image object and not including at least one of a width attribute or a height attribute:
obtain metadata from the image object, including at least one of image width or image height; and
include in the image tag at least one of a width attribute or a height attribute based on the obtained metadata.

16. A application delivery controller system, comprising one or more application delivery apparatuses, client devices, or server devices, the application delivery controller system comprising one or more processors and a memory, the memory comprising programmed instructions stored thereon and the one or more processors configured to be capable of executing the stored programmed instructions to:
obtain content from one or more servers as requested by a client computing device, the content comprising a hypertext markup language (HTML) document;
identify when one or more types of external references are included in the requested content and determine when the identified one or more types of external references in the requested content is an image object;
obtain external content referenced by the image object included in the requested content, when the determining indicates that the identified one or more types of external references in the requested content is the image object;
modify, prior to sending the requested content to the client computing device, the requested content to replace at least a portion of the image object with the image object referenced external content inline, wherein the inline external content referenced by the image object does not include another reference to an external location; and service the request by communicating the modified requested content to the client computing device.

17. The application delivery controller system of claim 16, wherein the one or more processors are further configured to be capable of executing the stored programmed instructions to:

identify each start script tag including a source attribute referencing the external content;

obtain external content referenced by the source attribute included in the requested content; and remove the source attribute and include the obtained external content referenced by the removed source attribute immediately following the start script tag, for each identified start script tag.

18. The application delivery controller system of claim 16, wherein the one or more processors are further configured to be capable of executing the stored programmed instructions to: convert each of the image object into a base64 representation and replace the reference to the image object with at least the base64 representation for each of an image tag in the requested content including a source attribute referencing an image object below a specified size before the requested content is modified.

19. The application delivery controller system of claim 18, wherein the specified size comprises an input predefined specified size or a maximum size of a uniform resource locator of a browser on the client computing device associated with the request for content.

20. The application delivery controller system of claim 16, further comprising steps to, for each of an image tag in the requested content including a source attribute referencing the image object and not including at least one of a width attribute or a height attribute:

obtain metadata from the image object, including at least one of image width or image height; and include in the image tag at least one of a width attribute or a height attribute based on the obtained metadata.

* * * * *